Oct. 9, 1962       M. C. BENEDICT         3,057,159
ROCKET IGNITOR
Filed June 23, 1959
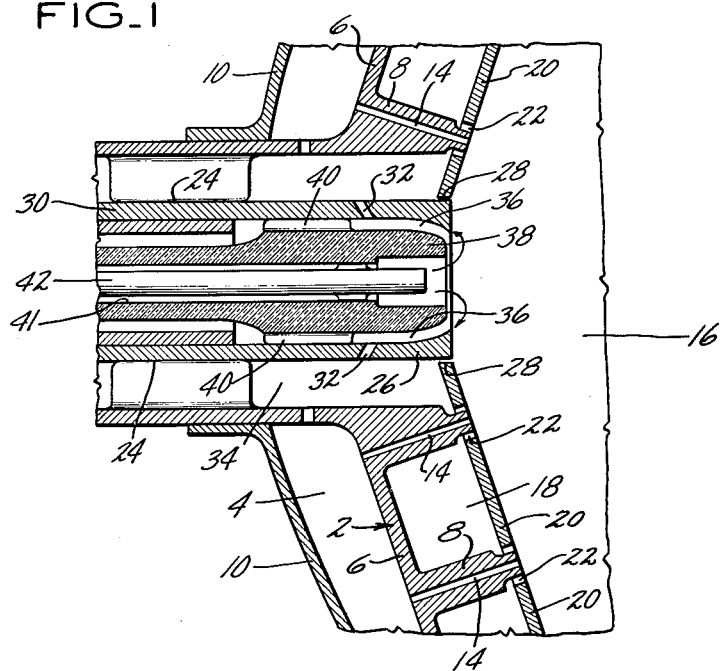
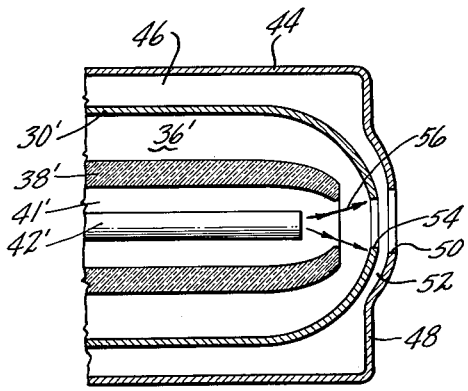
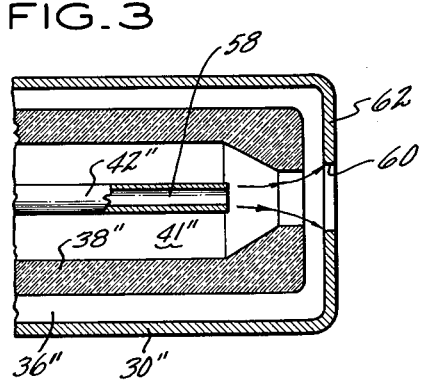
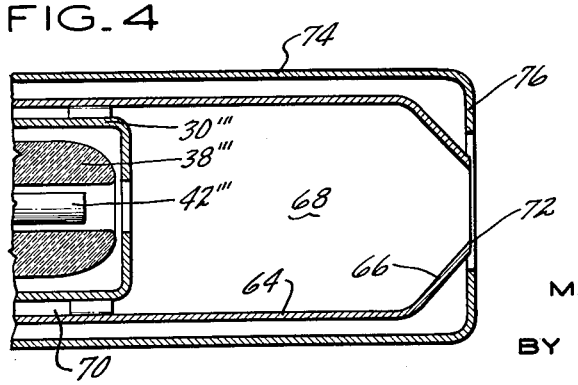
INVENTOR
MARCUS C. BENEDICT
BY Charles A. Warren
ATTORNEY sed as by webs 40 on the sleeve 38.
3,057,159
ROCKET IGNITOR
Marcus C. Benedict, Glastonbury, Conn., assignor to United Aircraft Corporation, East Hartford, Conn., a corporation of Delaware
Filed June 23, 1959, Ser. No. 822,373
4 Claims. (Cl. 60—39.82)

This invention relates to an ignitor particularly for use with a fluid propellant rocket.

One feature of the invention is the delivery of the fuel and oxidizer for ignition purposes through the gap across which the spark is directed. Another feature is the cooling of the ignitor during and after ignition.

In fluid propellant rockets it may be desirable to reignite at high altitudes or to ignite a second or third rocket stage. One feature is an ignitor which is operative at high altitudes, that is, at low ambient pressures. Another feature is the location of the spark gap directly within the mixing area of the ignitor fluids with the flow of the fluids through the spark.

Other features and advantages will be apparent from the specification and claims, and from the accompanying drawing which illustrates an embodiment of the invention.

FIG. 1 is a fragmentary sectional view through the head of a rocket.

FIG. 2 is a view similar to FIG. 1 of a modification.

FIG. 3 is a view similar to FIG. 1 of another modification.

FIG. 4 is a view similar to FIG. 1 of a further modification.

The invention is shown in connection with an injector head 2 for a rocket in which the head has a chamber 4 for one propellant located between a main plate 6 having projections 8 and a cap 10, the propellant from this chamber being discharged through the passages 14 in the projections 8 into the combustion chamber 16. Another chamber 18 located between the plate 6 and a second plate 20 spaced therefrom receives a second propellant which is discharged through openings 22 surrounding the projections 8. This structure is described by way of example and is not necessarily the particular arrangement utilized in conjunction with the ignitor.

The injector head has a central opening 24 therein to receive the ignitor 26 which extends from the opening 24 to a central opening 28 in the second plate 20. The ignitor is an assembly complete in itself and may be positioned as a unit within the injector head.

The ignitor includes an outer sleeve 30 which is supported within the injector head and which may have radial passages 32 for a flow of propellant from the annular space 34 surrounding the sleeve into an annular space 36 within the sleeve. The inner wall of the space 36 is defined by a second sleeve 38 within the sleeve 30 and held in spaced relation thereto as by webs 40 on the sleeve 38.

The sleeve 38, which is an insulator, has a central bore 41 within which is located the electrode 42 for the ignitor. This electrode is supported in spaced relation to the walls of the passage 41 and therefore provides an annular passage for a flow of propellant around the electrode to the spark end of the ignitor.

The sleeve 38 is preferably made of an insulating material so that the spark gap across which the spark must jump is from the inner or right-hand end of the electrode 42 to the inner or right-end end of the outer sleeve 30, the latter constituting the other electrode or ground. Since one propellant flows through the bore and discharges over the inner end of the electrode and since the other propellant discharges from the passage 36 and around the end of the middle sleeve 38, it is apparent that the propellants mix in the region of the spark gap between the ends of the electrode 42 and the sleeve 30. The spark jumps across this gap for the purpose of ignition of the mixed fluids.

A modification is shown in FIG. 2 in which the outer sleeve 30', comparable to the sleeve 30 of FIG. 1, is in turn surrounded by another sleeve 44 to define an annular passage 46 therebetween so that one of the propellants may flow through this space for cooling purposes. For additional cooling, the downstream end of the outer sleeve 44 has an integral cap 48 with a central opening 50 through which the ignited fluids are discharged into the combustion chamber. With this arrangement, the propellant flowing through the space 46 discharges through the radially extending space 52 between the inturned downstream end 54 of the sleeve 30' and the cap 50 thereby effectively cooling the ignitor during the part of the operating cycle of the rocket when the ignitor is not functioning.

In this arrangement, there is the second or middle sleeve 38' which constitutes an insulator defining the annular passage 36' and the central electrode 42' with the surrounding passage 41'. The spark gap in this arrangement is between the central electrode and the inner edge of the inturned flange 54 so that the spark jumps substantially as indicated by the arrows 56.

FIG. 3 is similar to FIG. 2 without the surrounding sleeve 44. In this figure the outer sleeve 30" defines the annular passage 36" surrounding the insulating sleeve 38" which in turn provides the annular passage 41" between it and the central electrode 42". In this arrangement, the electrode itself may be made hollow to have an axial passage 58 therein. Thus, the propellants discharging through the passages 36", 41" and 58 mix within the space between the downstream end of the electrode 42" and the central opening 60 formed by the inturned flange 62 on the downstream end of the sleeve 30". In ignition, a spark will jump through this space, the spark gap being between the downstream end of the electrode and the periphery of the opening 60, as shown.

Referring now to FIG. 4, the ignitor is similar to that above described having the outer sleeve 30''' surrounding the insulator sleeve 38''' which in turns surrounds the electrode 42'''. This ignitor assembly is positioned within a surrounding sleeve 64 with the end of the sleeve 30''' spaced from the inturned flange 66 of the sleeve 64 to define a smaller combustion chamber 68. The products of combustion igniting at the ends of the ignitor proper burn additionally with propellant delivered through the annular space 70 surrounding the sleeve 30''' so that combustion continues to occur in the chamber 68. From this chamber the ignited propellants discharge in a torch form through the opening 72 defined by the flange 66 into the main combustion chamber.

In this arrangement, the sleeve 64 may have another surrounding sleeve 74 spaced from the sleeve 64 and having an inturned downstream end flange 76. With this arrangement, the opening in the injector head itself would be of such a diameter as to receive the entire injector assembly including the outermost sleeve 74.

It is to be understood that the invention is not limited to the specific embodiment herein illustrated and described, but may be used in other ways without departure from its spirit as defined by the following claims.

I claim:
1. A fixed ignitor concentric about an axis and adapted for use in the injector head of a rocket chamber including a first hollow sleeve having an opening at one end thereof which end constituting a first electrode, a second sleeve concentrically located within said first sleeve to form a first annular passage therewith and terminating in an open end positioned within said first sleeve and spaced axially from said first electrode in a direction away from the rocket chamber to form a recessed outlet for said first annular passage, said second sleeve being made of insulating material, a second electrode concentrically fixed in position within said second sleeve to form a second annular passage therewith and terminating within said second sleeve and positioned to have its operative end spaced axially from said second sleeve's open end in a direction away from said rocket chamber to form a recessed outlet for said second annular passage so that an igniting spark passing between said second electrode operative end and said first electrode will pass by the open end of said second sleeve and hence across said outlets for both said first and second annular passages, and means for delivering a first fluid propellant through said first annular passage and its outlet and a second fluid propellant through said second annular passage and its outlet.

2. Apparatus according to claim 1 wherein said first and second sleeves are substantially radially extending adjacent their respective openings to form a substantially radially directed fluid propellant passage therebetween to cool said first sleeve adjacent its opening.

3. Apparatus according to claim 1 including additional sleeve elements forming a combustion chamber between said first sleeve and the rocket chamber and including a convergent opening through which the products of combustion which occur therein may be projected into the rocket chamber.

4. Apparatus according to claim 1 wherein said second electrode is hollow and including means for passing fluid propellant therethrough.

References Cited in the file of this patent

UNITED STATES PATENTS

| | | |
|---|---|---|
| 1,960,344 | Muir | May 29, 1934 |
| 2,574,495 | Parker | Nov. 13, 1951 |
| 2,635,423 | Oakes | Apr. 21, 1953 |
| 2,695,496 | Goddard | Nov. 30, 1954 |
| 2,701,324 | Peroutky | Feb. 1, 1955 |
| 2,731,079 | Smits | Jan. 17, 1956 |
| 2,741,085 | Prentiss | Apr. 10, 1956 |
| 2,831,993 | Lentz | Apr. 22, 1958 |